United States Patent
Chudoba

(10) Patent No.: US 7,646,787 B2
(45) Date of Patent: Jan. 12, 2010

(54) METHOD FOR THE PACKET-ORIENTED TRANSMISSION OF DATA, NETWORK INTERMEDIATE NODES AND TELECOMMUNICATIONS NETWORK

(75) Inventor: Christian Chudoba, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 773 days.

(21) Appl. No.: 10/853,747

(22) Filed: May 26, 2004

(65) Prior Publication Data

US 2005/0018689 A1 Jan. 27, 2005

(30) Foreign Application Priority Data

May 27, 2003 (EP) .................................. 03090159

(51) Int. Cl.
*H04J 3/16* (2006.01)
*G06F 15/16* (2006.01)
*G06F 9/445* (2006.01)

(52) U.S. Cl. ........................ 370/466; 709/203; 709/237; 717/178

(58) Field of Classification Search ........................ None
See application file for complete search history.

(56) References Cited

U.S. PATENT DOCUMENTS

| | | | |
|---|---|---|---|
| 5,768,119 A * | 6/1998 | Havekost et al. ................ 700/4 |
| 6,075,796 A * | 6/2000 | Katseff et al. ................ 370/466 |
| 6,130,917 A * | 10/2000 | Monroe ........................ 375/295 |
| 6,324,564 B1 * | 11/2001 | Thielke et al. ............... 709/202 |
| 6,397,259 B1 | 5/2002 | Lincke et al. |
| 6,836,657 B2 * | 12/2004 | Ji et al. ........................ 455/419 |
| 2002/0034963 A1 * | 3/2002 | Lansing et al. ............... 455/552 |
| 2002/0101848 A1 * | 8/2002 | Lee et al. ..................... 370/349 |
| 2002/0116533 A1 * | 8/2002 | Holliman et al. ............ 709/246 |
| 2002/0131405 A1 * | 9/2002 | Lin et al. ..................... 370/352 |
| 2002/0186683 A1 * | 12/2002 | Buck et al. ................... 370/352 |
| 2002/0187775 A1 * | 12/2002 | Corrigan et al. ............. 455/414 |
| 2003/0097592 A1 | 5/2003 | Adusumilli |
| 2004/0052252 A1 * | 3/2004 | Karaoguz et al. ........... 370/389 |
| 2004/0243703 A1 * | 12/2004 | Demmer et al. ............. 709/224 |

FOREIGN PATENT DOCUMENTS

| WO | WO 02/11389 A2 | 2/2002 |
|---|---|---|
| WO | WO 03/001745 A1 | 1/2003 |

* cited by examiner

*Primary Examiner*—Gregory B Sefcheck
(74) *Attorney, Agent, or Firm*—King & Spalding L.L.P.

(57) ABSTRACT

The invention relates to a method for the packet-oriented transmission of data in telecommunications networks between a communications terminal and a data computer in which the data is transmitted via an intermediately connected protocol-converting intermediate node which converts messages in a connectionless transmission protocol into messages in a connection-oriented transmission protocol, and vice versa. In the method, a program module is transferred to the communications terminal which permits the communications terminal to transmit and receive messages by the connectionless transmission protocol. Furthermore, the invention relates to a network node and a telecommunications network.

15 Claims, 3 Drawing Sheets

METHOD FOR THE PACKET-ORIENTED TRANSMISSION OF DATA, NETWORK INTERMEDIATE NODES AND TELECOMMUNICATIONS NETWORK

CLAIM FOR PRIORITY

This application claims the benefit of priority to European Application No. 03090159.9, filed on May 27, 2003 in the German language, the contents of which are hereby incorporated by reference.

TECHNICAL FIELD OF THE INVENTION

The invention relates to a method for the packet-oriented transmission of data in telecommunications networks between a communications terminal and a data computer, a network intermediate node and a telecommunications network.

BACKGROUND OF THE INVENTION

For the packet-oriented transmission of data in telecommunications networks between communications terminals and data computers, it is generally known to use a connection-oriented transmission protocol (for example the TCP=Transport Control Protocol). The connection-oriented transmission protocol sets up a connection between the communications terminal and the data computer, over which connection a multiplicity of supervisory measures are carried out. For example, when the transport control protocol is used, it is checked whether all the data packets which are emitted by the respective data transmitter arrive at the respective data receiver, and whether the sequence of the transmitted data packets at the receiver corresponds to the order with which these packets have been emitted at the transmitter. For this purpose, a multiplicity of confirmation messages ("acknowledgements") are exchanged during the transmission of data between the communications terminal and the data computer. In particular, in networks with long loop transit times (response times), the need to wait for such confirmation messages leads to a reduction in the data transmission rate, although a high physically available bandwidth may possibly be present. During the connection setup and connection release of the data transmission, signaling messages are also repeatedly transmitted to and fro between the communications terminal and the data computer. For example, when the transport control protocol is used for the connection setup, what is referred to as triple handshaking is carried out, and, when it is used for the connection release, what is referred to as quadruple handshaking is carried out. As a result of this multiplicity of security and supervisory measures, the transmission of data between the communications terminal and the data computer is delayed so that significant waiting times may occur during the packet-oriented data transmission.

SUMMARY OF THE INVENTION

The present invention discloses a method, a network node and a telecommunications network with which high-speed packet-oriented data transmission can be implemented.

In one embodiment of the invention, there is a method for the packet-oriented transmission of data in telecommunications networks between a communications terminal and a data computer, where the data is transmitted via an intermediately connected protocol-converting intermediate node which converts messages in a connectionless transmission protocol into messages in a connection-oriented transmission protocol, and vice versa, when the method is initiated, a start data request message is emitted by the communications terminal by means of the connection-oriented transmission protocol, this start data request message is received by the intermediate node, the intermediate node detects that the start data request message has been transmitted by means of the connection-oriented transmission protocol, a program module is transferred by the intermediate node by means of the connection-oriented transmission protocol to the communications terminal, which module permits the communications terminal to transmit and recieve messages by means of the connectionless transmission protocol, and in response, the communications terminal transmits a first data request message to the data computer by means of the connectionless transmission protocol.

In this context, a connection-oriented transmission protocol is understood to be a transmission protocol which ensures fault-free transmission of data packets between a data transmitter and a data receiver by means of extensive monitoring of the transmission of data. This is similar to the simulation of a fixed link (for example a data cable) between the data transmitter and the data receiver, for which reason such a transmission protocol is referred to as a "connection-oriented" transmission protocol. However, in practice, there is generally no fixed link in the form of a data cable between the data transmitter and the data receiver, but instead the data packets are transmitted between the data transmitter and the data receiver by means of paths alternating on a case-by-case basis over a wide variety of switching centers.

A connectionless transmission protocol is to be understood as a transmission protocol during whose application there is no monitoring to determine whether the data packets emitted by the data transmitter arrive completely and/or in the correct sequence at the data receiver. When such a connectionless transmission protocol is used, it is therefore necessary to dispense with checking the transmission of each individual data packet.

In another embodiment according to the invention, a connectionless transmission protocol is advantageously used and messages in a connection-oriented message transmission protocol are converted into the connectionless transmission protocol, and vice versa, by the protocol-converting intermediate node. As a result of the use of the connectionless transmission protocol, the data transmission rate can be considerably increased since the complicated and time-consuming monitoring mechanisms for checking the transmission of the data packets are dispensed with. As a result, a significantly faster transmission of data can be implemented. Furthermore, the communications terminal is advantageously automatically equipped to participate in the method according to the invention by transferring a program module to the communications terminal. In this way, communications terminals which were originally only capable of communicating by means of connection-oriented transmission protocols can advantageously also be used for the method according to the invention.

In another embodiment according to the invention, the first data request message is received by the intermediate node, which is arranged in a message flow-related fashion between the communications terminal and the data computer, of the telecommunications network, this data request message is transmitted by the intermediate node to the data computer by means of the connection-oriented transmission protocol, a data message which is created by the data computer in response to the data request message and is transmitted to the communications terminal by means of the connection-oriented transmission protocol is received by the intermediate node, and the data message is transmitted to the communications terminal by the intermediate node by means of the connectionless transmission protocol. As a result, the method according to the invention can advantageously also be used in data computers which can transmit their data by means of a connection-oriented transmission protocol. This enables, in particular, data to be transmitted to Internet servers which often operate with the connection-oriented transmission protocol TCP.

The invention can proceed in one embodiment such that the program module is transferred to the communications terminal if the intermediate node detects that the communications terminal is a mobile telephone terminal.

The invention can also proceed in another embodiment such that the program module is transferred to the communications terminal if the intermediate node detects that the program module has not yet been installed on the communications terminal. This advantageously avoids the program module being unnecessarily transferred to the communications terminal if the terminal has already been equipped with the program module.

In still another embodiment of the invention, it is possible to use a connection-oriented transmission protocol of the transport layer (layer 4) of the ISO/OSI communications model as the connection-oriented transmission protocol.

In one aspect of the method according to the invention, it is possible to use the transmission control protocol as the connection-oriented transmission protocol. The transmission control protocol is advantageously used by a plurality of communications terminals and data computers during the transmission of data, for example for Internet applications.

In another embodiment of the method according to the invention, a connectionless transmission protocol of the network layer (layer 3) of the ISO/OSI communications model can be used as a connectionless transmission protocol.

In another aspect of the method according to the invention, the user datagram protocol can be used as the connectionless transmission protocol. The user datagram protocol is advantageously a standardized transmission protocol so that this transmission protocol can be used easily and with little expenditure in a way which encompasses more than one system.

The invention, in another embodiment, can be configured such that a communications terminal which can be operated in a wire-free fashion is used as the communications terminal, and a mobile telephone network is used as the telecommunications network.

In another embodiment of the invention, there is an arrangement in which including an intermediate node for a telecommunications network for the packet-oriented transmission of data between a data computer and a communications terminal, which intermediate node is designed to receive messages which are transmitted by the communications terminal by means of a connectionless transmission protocol, to pass these messages on to the data computer by means of a connection-oriented transmission protocol, to receive messages which have been transmitted by the data computer by means of the connection-oriented transmission protocol, and to pass these messages on to the communications terminal by means of the connectionless transmission protocol, and which intermediate node has detection means with which it is possible to detect whether a program module which permits the communications terminal to transmit and receive messages by means of the connectionless transmission protocol is installed on the communications terminal.

Such an intermediate node can advantageously allow protocol conversion to be performed between the connection-oriented transmission protocol and the connectionless transmission protocol, and vice versa, so that the speed of the transmission of data can be considerably increased by the use of the connectionless transmission protocol. The detection means can advantageously be used to detect whether the communications terminal is capable of communicating by means of the connectionless transmission protocol.

The intermediate node can advantageously be configured according to the invention such that it has a detector device with which it is possible to detect whether an incoming message is transmitted by the connectionless transmission protocol or by the connection-oriented transmission protocol. As a result, the intermediate node can advantageously detect which transmission protocol is being used when a message arrives. After the detection, the intermediate node decides whether or not it is necessary to convert the data into a different transmission protocol.

The intermediate node can advantageously also be configured such that it has a transmitter device with which an incoming message can be passed on by means of the connectionless transmission protocol. The intermediate node can also be configured such that it has a transmitter device with which an incoming message can be passed on by means of the connection-oriented transmission protocol.

The intermediate node can also be configured such that it has a transmission device with which it is possible to transmit to the communications terminal a program module which permits messages to be transmitted and received by the connectionless transmission protocol. The communications terminal can advantageously automatically be equipped by the transmission device to use the connectionless transmission protocol to transmit a corresponding program protocol is transmitted to the communications terminal.

According to the invention, an intermediate node of the type described above can be used in a telecommunications network.

In this context, the intermediate node can be arranged in a message-related fashion between a communications terminal and a data computer which is connected to the telecommunications network.

BRIEF DESCRIPTION OF THE INVENTION

The invention will be explained in more detail below with reference to exemplary embodiments which are illustrated in the Figures, of which:

DETAILED DESCRIPTION OF THE INVENTION

Figure 1:
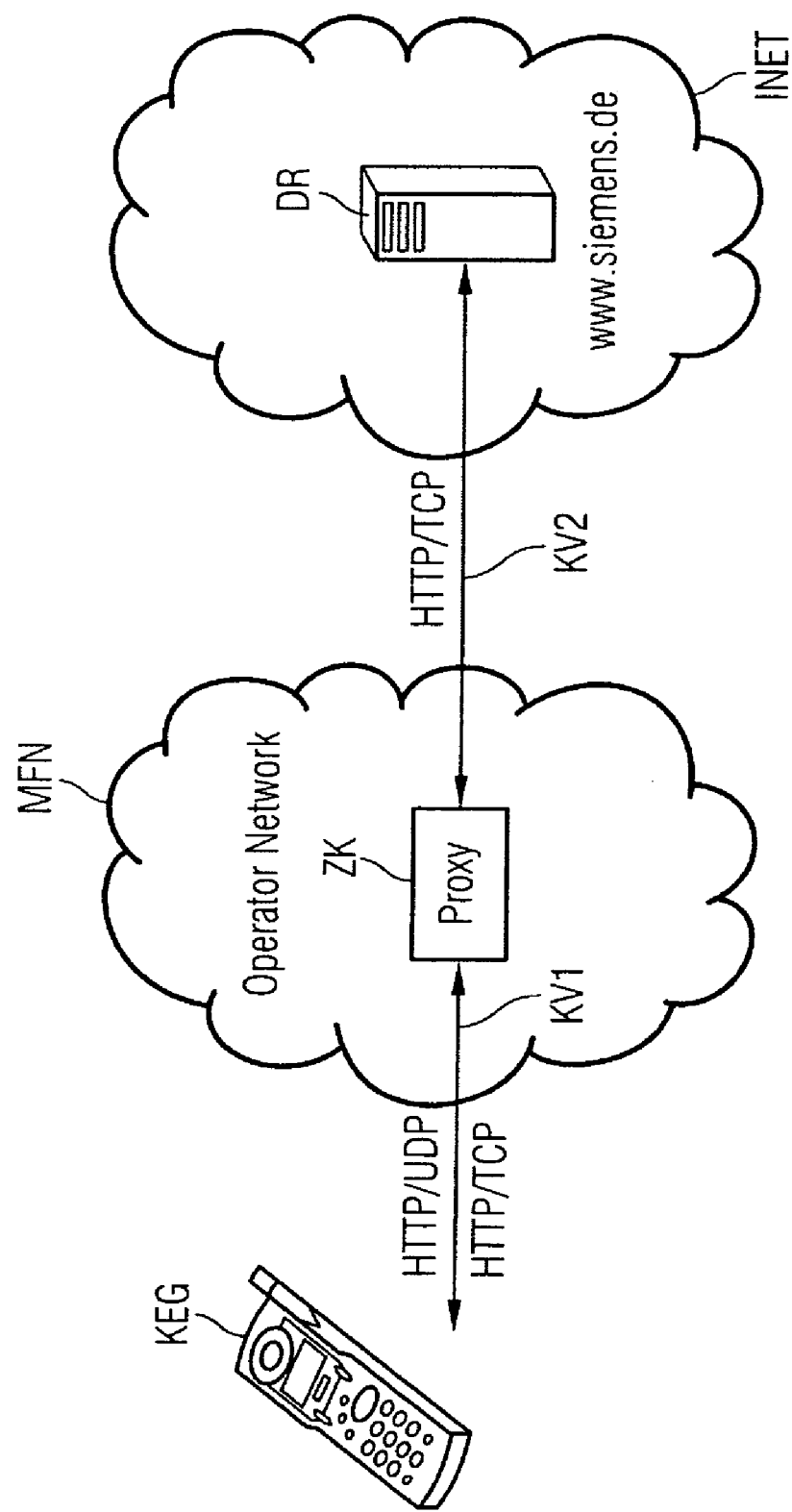
FIG. 1 shows a transmission of data between a communications terminal and a data computer.

FIG. 1 illustrates a communications terminal KEG which is connected to a mobile telephone network MFN. The communications terminal KEG may be, for example, a mobile telephone, a mobile computer with mobile telephone interface or a palmtop. The mobile telephone network MFN may be configured, for example, as a mobile telephone network of the second or third generation, for example as a mobile telephone network according to one of the standards GSM, GPRS, UMTS or CDMA. The mobile telephone network MFN contains an intermediate node ZK which is configured in the form of a proxy computer. The communications terminal KEG is connected to the intermediate node ZK via a first communications link KV1. The communications terminal KEG can communicate via said first communications link KV1 on the basis of the Hypertext Transfer Protocol HTTP by means of a connectionless transmission protocol UDP (UDP=User Datagram Protocol). The protocol UDP operates in a connectionless fashion and without confirmation of the transmitted data. However, the communications terminal KEG can also transmit data via this first communications link KV1 by means of the connection-oriented transmission protocol TCP (TCP=Transport Control Protocol).

The intermediate node ZK is connected to a data computer DR via a second communications link KV2, the data computer being a component of a further communications network, in this case a component of the Internet INET. For example, it is possible to use as data computer DR an Internet server on which a series of Internet pages are made available for retrieval. The intermediate node ZK communicates with the data computer DR via the second communications link KV2 by means of the connection-oriented transmission protocol TCP. This communication takes place on the basis of the Hypertext Transfer Protocol HTTP. The data computer DR can be addressed on the internet by means of an Internet address.

Figure 2:
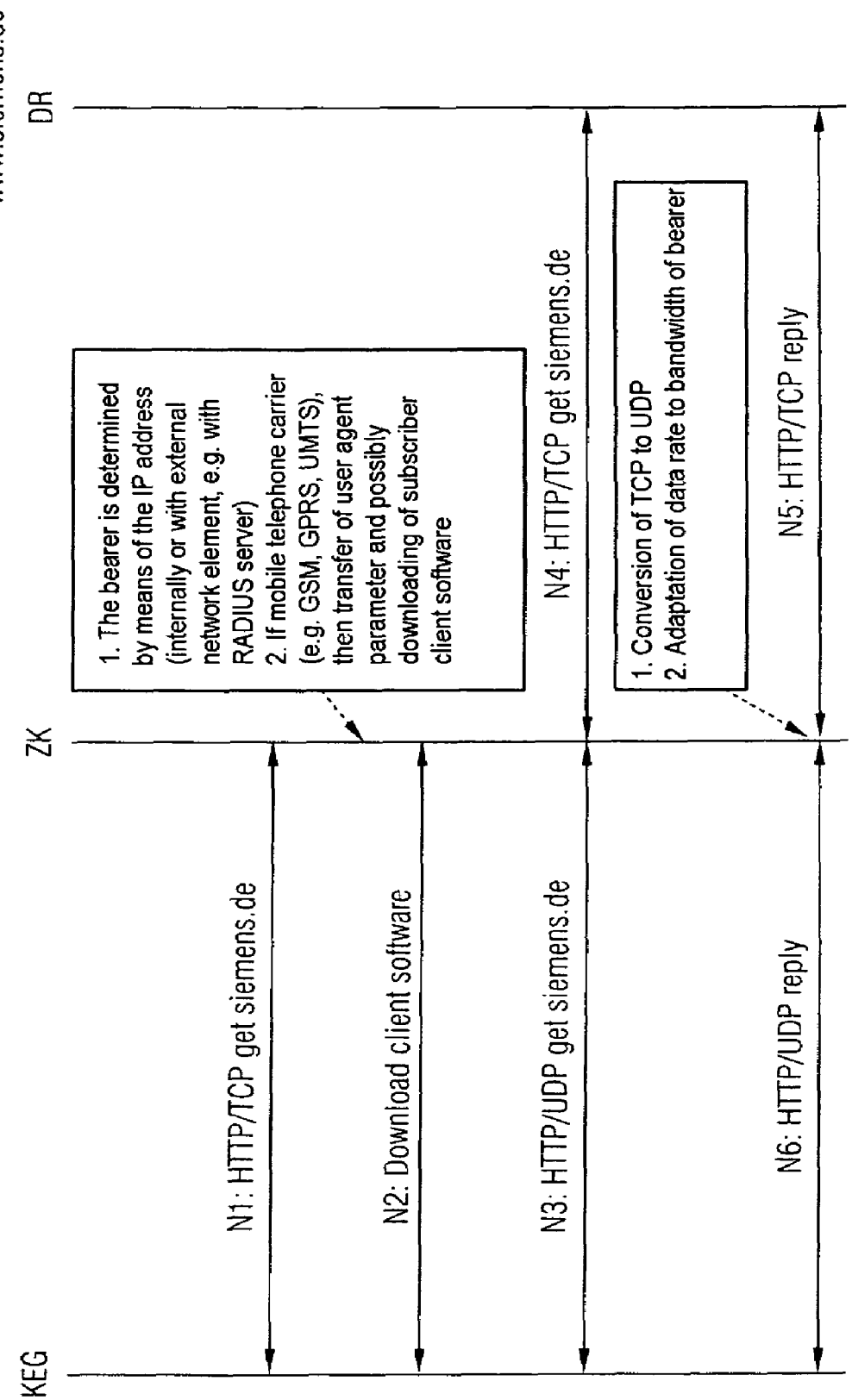
FIG. 2 shows an exemplary exchange of messages between a communications terminal, an intermediate node and a data computer.

FIG. 2 is a diagrammatic illustration of an example of a signal flow between the communications terminal KEG, the intermediate node ZK and the service computer DR. At the start of the method, the communications terminal KEG transmits a start data request message N1 "get siemens.de" to the service computer DR by means of the connection-oriented transmission protocol TCP. This start request message N1 passes to an intermediate node ZK of the telecommunications network which is arranged in a message flow-related fashion between the communications terminal KEG and the data computer, and is retained by this intermediate node. The intermediate node detects, from the type of communications link KV1, that the start data request message N1 has been transmitted by means of connection-oriented transmission protocol TCP. Furthermore, the intermediate node ZK determines which bearer was used to transmit the start data request message N1. This bearer can be determined, for example, by evaluating the IP address of the communications terminal KEG which was transmitted to the intermediate node together with the start data request message N1. Alternatively, or in addition, the bearer can also be determined using an external network element of the mobile telephone network, for example a RADIUS server at which the communications terminal KEG has authenticated itself at the network access in a known fashion. By interrogating a RADIUS attribute from this RADIUS server, the intermediate node can also determine the type of bearer. As a result of this bearer determination, the information that the communications terminal KEG uses, for example, one of the bearers UMTS, GPRS, GSM or CDMA is present in the intermediate node ZK.

In this specific exemplary embodiment the method according to the invention is normally carried out when the communications terminal KEG is a mobile communications terminal in which the communications link KV1 is implemented by means of a radio interface. However, if the communications terminal KEG1 is, for example, a fixed network telephone (bearer ISDN), it is then possible to determine whether or not to apply the method on a case-by-case basis.

In the exemplary embodiment, it is then defined that the communications terminal KEG uses, for example, the carrier UMTS. In a subsequent step, the intermediate node ZK checks whether the communications terminal KEG is capable of using the connectionless transmission protocol UDP to transmit data. In particular, it is checked here whether the communications terminal KEG is equipped with software which permits the communications terminal to transmit and receive messages by means of the transmission protocol UDP. For this purpose, the HTTP parameter "user agent" is read out from the start data request message N1. In this parameter, the types of transmission protocols which the communications terminal KEG can use for its transmission of data are coded. During the evaluation of the parameter "user agent", if the intermediate node detects that the communications terminal KEG does not have the necessary software to transmit and receive messages by means of the connectionless transmission protocol UDP, the necessary software is transmitted by the intermediate node ZK to the communications terminal KEG (message N2) and installed on the communications terminal KEG. In response, the communications terminal KEG transmits, by means of a message N3, a first data request message N3 to the service computer DR by means of the connectionless transmission protocol UDP. This message N3 corresponds in terms of content to the start request message N1. However, instead of the connection-oriented transmission protocol TCP, the connectionless data transmission protocol UDP is used. The first data request message N3 reaches the intermediate node ZK and is received by it. The intermediate node ZK then performs protocol conversion of the connectionless transmission protocol UDP into the connection-oriented transmission protocol TCP and passes the data request message on to the data computer (message N4) by means of the connection-oriented transmission protocol TCP. The data computer DR receives this data request message N4 and processes it, i.e. in this case the data recipient prepares the desired Internet page "siemens.de" and transmits the Internet page in the form of a data message N5 "reply" to the communications terminal KEG by means of the connection-oriented transmission protocol TCP. The intermediate node ZK receives this data message N5, detects the connection-oriented transmission protocol TCP, carries out protocol conversion into the connectionless transmission protocol UDP and passes on the message "reply" to the communications terminal KEG as message N6 using the connectionless transmission protocol UDP. The requested data is then present at the communications terminal KEG.

The intermediate node can optionally adapt the data transmission rate to the bearer transmitted by the communications terminal, before the intermediate node transmits the data message N6 to the communications terminal KEG by means of the transmission protocol UDP. For this purpose, the intermediate node ZK buffers the data message received by the service computer DR (for example in a buffer for Internet pages) and then passes on the message N6 to the communications terminal KEG at a data transmission rate which corresponds to the data rate which can be transmitted by the bearer. This data rate will generally be lower, for example, in the case of a GSM bearer, than in the case of a UMTS bearer. As a result, it is advantageously possible to ensure smooth transmission of data via the first communications link KV1 (air interface) and to avoid undesired effects, for example overflowing of data buffers, as a result of an excessively high data transmission rate which cannot be carried out by the mobile telephone network.

Figure 3:
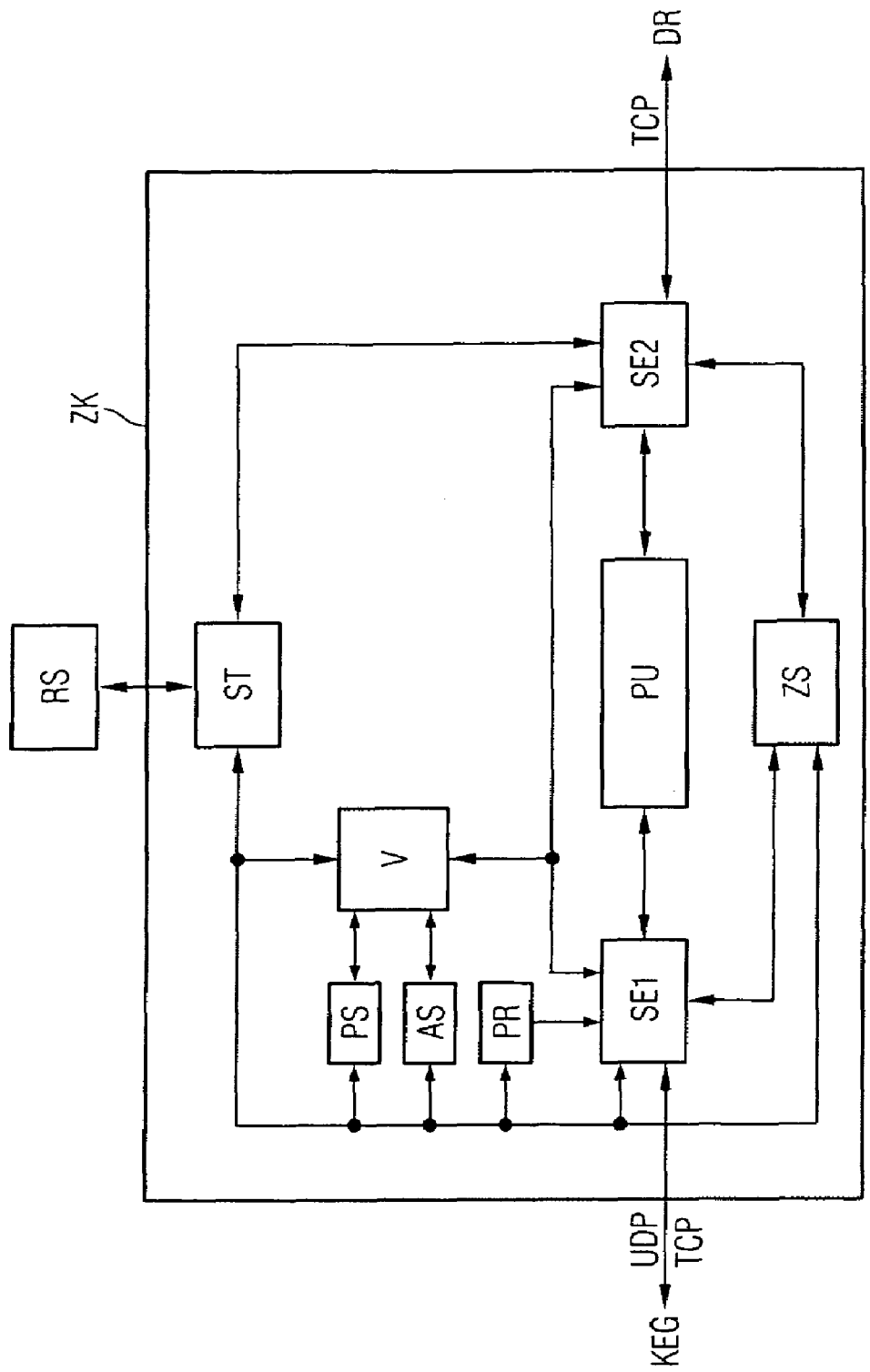
FIG. 3 shows a more detailed exemplary embodiment of an intermediate node.

FIG. 3 illustrates elements of the intermediate node ZK which are essential to the invention and have been selected in a detailed exemplary embodiment. The intermediate node ZK has a transceiver unit SE1 by means of which it can exchange data with the communications terminal KEG, both using the connection-oriented transmission protocol TCP and using the connectionless transmission protocol UDP. The transceiver unit SE1 is connected to a protocol converter PU which is capable of converting the transmission protocol UDP into the transmission protocol TCP, and vice versa. The protocol converter PU is connected to a second transceiver unit SE2. This second transceiver unit SE2 is capable of exchanging data with the service computer DR using the connection-oriented transmission protocol TCP. The units of the intermediate node ZK are monitored and controlled by a control unit ST. The transceiver unit SE1 and the second transceiver unit SE2 are connected to an analog comparator unit V. When messages are received, the transceiver units read out the IP addresses of the respective message transmitters from the received messages as required and transmit then to the comparator unit V. The comparator unit V compares these IP addresses with IP addresses which are stored in an address memory AS and, when there is correspondence, reads out of the address memory AS the information—about which bearer the respective message transmitter (for example the communications terminal KEG) is using to transmit its data to the intermediate node ZK—which is also stored in the address memory AS. In this way, the intermediate node ZK can therefore detect the bearer used by the message transmitter, for example the communications terminal KEG. Alternatively, or in addition, the information about how the message transmitter has authenticated itself at the network access is read out by the control unit ST from a network element which is external to the intermediate node, for example from a RADIUS server RS. The RADIUS server transfers a corresponding RADIUS attribute to the intermediate node, and the type of the bearer is detected by means of this attribute.

When a start data request message N1 reaches the first transceiver unit SE1 of the intermediate node ZK, the transceiver unit SE1 transmits, to the comparator unit V, the HTTP parameter "user agent" which has also been transmitted together with the start data request message N1. This comparator unit V compares the parameter user agent with parameters stored in a parameter memory PS, and can thus detect whether the communications terminal KEG is capable of transmitting and receiving messages by means of the connectionless transmission protocol UDP. If this is not the case, a program module which permits the specific communications terminal to transmit and receive messages by means of the protocol UDP is read out of a program memory PR, and the program module is transmitted to the communications terminal KEG by means of the transceiver unit SE1.

For the purpose of possibly necessary adaptation of the data rate when the data message N6 is transmitted (cf. FIG. 2) to the bearer which is determined, the first transceiver unit SE1 and the second transceiver unit SE2 are connected to a buffer ZS. In this buffer it is possible, for example, for an Internet page which is received by the data computer DR or a file which is downloaded from the data computer DR to be buffered if necessary when adapting the data transmission rate.

The described invention has a series of advantages. Using an intermediate node, for example in the form of a proxy (which converts data traffic using connection-oriented transmission protocols to data traffic using connectionless transmission protocols, and vice versa, and which therefore converts, for example, Internet TCP data traffic to UDP data traffic for the mobile Internet, and vice versa), the data throughput rate for typical Internet uses (for example for retrieval of websites) can be significantly increased, and an increase by a factor of 2 is conceivable. This is achieved by using a protocol which operates without complex tests and confirmation messages for the transmitted data. Since the reliability of the transmission of data can be ensured by means of radio link protocols such as, for example, by means of radio link protocol (RLP) and radio link control (RLC), the data transmission is sufficiently reliable with the method according to the invention. Such radio link protocols in fact bring about a very high level of reliability at the TCP/IP layers. For this reason, it is possible to dispense, for example, with monitoring the delivery of the data packets. Such radio link protocols can be arranged below the "IP layer" in the ISO/OSI model. Standardized connectionless transmission protocols (for example UDP) can advantageously be used so that the method according to the invention and the arrangement according to the invention can also be used without difficulty in the exchange of data in a way which encompasses more than one network or country. When the invention is used, waiting times of mobile telephone users when using their communications terminals can be significantly reduced when they participate, for example, in Internet data traffic. The intermediate node can detect the type of the bearer and determine whether the communications terminal KEG has corresponding data transmission software. If appropriate, the intermediate node ZK transmits necessary software to the communications terminal KEG. Such an intermediate node may also be referred to as an "intelligent proxy computer" owing to its capabilities. The intermediate node detects when the communications terminal is using the connectionless transmission protocol by means of the software and converts the connectionless transmission protocol into the connection-oriented transmission protocol (protocol conversion). During the conversion of data computer messages transmitted using the connection-oriented transmission protocol into data messages for the communications terminal which have been transmitted using the connectionless transmission protocol, the intermediate node optimizes the data rate in accordance with the detected bearer type and thus optimizes the utilization of the network, for example of the UMTS mobile telephone network.

What is claimed is:

1. A method for packet-oriented transmission of data in telecommunications networks between a communications terminal and a data computer, comprising:
  transmitting the data via a connected protocol-converting intermediate node which converts messages in a connectionless transmission protocol into messages in a connection-oriented transmission protocol, and vice versa;
  when the method is initiated, emitting a start data request message by the communications terminal according to the connection-oriented transmission protocol;
  receiving the start data request message by the intermediate node;
  detecting, via the intermediate node, that the start data request message has been transmitted according to the connection-oriented transmission protocol;
  transferring a program module by the intermediate node according to the connection-oriented transmission protocol to the communications terminal, which module permits the communications terminal to transmit and receive messages according to the connectionless transmission protocol, wherein the program module is transferred to the communications terminal if the intermediate node detects that the communications terminal is a mobile telephone terminal; and in response, transmitting, via the communications terminal, a first data request message to the data computer according to the connectionless transmission protocol.

2. The method as claimed in claim 1, wherein the first data request message is received by the intermediate node, of the telecommunications network, the data request message is transmitted by the intermediate node to the data computer according to the connection-oriented transmission protocol, a data message which is created by the data computer in response to the data request message and is transmitted to the communications terminal according to the connection-oriented transmission protocol is received by the intermediate node, and the data message is transmitted to the communications terminal by the intermediate node according to the connectionless transmission protocol.

3. The method as claimed in claim 1, wherein the program module is transferred to the communications terminal if the intermediate node detects that the program module has not yet been installed on the communications terminal.

4. The method as claimed in claim 1, wherein a connection-oriented transmission protocol of the transport layer of the ISO/OSI communications model is used as the connection-orientated transmission protocol.

5. The method as claimed in claim 1, wherein the transmission control protocol is used as the connection-oriented transmission protocol.

6. The method as claimed in claim 1, wherein a connectionless transmission protocol of the network layer of the ISO/OSI communications model is used as a connectionless transmission protocol.

7. The method as claimed in claim 1, wherein the user datagram protocol is used as the connectionless transmission protocol.

8. The method as claimed in claim 1, wherein a communications terminal which can be operated in a wire-free fashion is used as the communications terminal, and a mobile telephone network is used as the telecommunications network.

9. An intermediate node for a telecommunications network for packet-oriented transmission of data between a data computer and a communications terminal, the intermediate node comprising:

a first transceiver unit to receive messages which are transmitted by the communications terminal according to a connectionless transmission protocol and to pass messages on to the communications terminal according to a connectionless transmission protocol, a second transceiver unit to pass the messages on to the data computer by a connection-oriented transmission protocol and to receive messages which have been transmitted by the data computer according to a connection-oriented transmission protocol, and a comparator unit, which reads out of an address memory which bearer the communications terminal uses to transmit data to the intermediate node, and a program memory, wherein the intermediate node is operable to transmit to the communications terminal a program module from the program memory which permits messages to be transmitted and received by the communications terminal via the connectionless transmission protocol.

10. The intermediate node as claimed in claim 9, wherein the first transceiver unit comprises a detection device that detects whether an incoming message is transmitted according to the connectionless transmission protocol or according to the connection-oriented transmission protocol.

11. The intermediate node as claimed in claim 9, wherein the first transceiver unit comprises a transmitter device to transmit an incoming message according to the connectionless transmission protocol.

12. The intermediate node as claimed in claim 9, wherein the first transceiver unit comprises a transmitter device to transmit an incoming message according to the connection-oriented transmission protocol.

13. The intermediate node as claimed in claim 9, wherein the first transceiver unit comprises a transmission device that transmits to the communications terminal a program module which permits messages to be transmitted and received by the communications terminal according to the connectionless transmission protocol.

14. A telecommunications network, comprising an intermediate node for a telecommunications network for packet-oriented transmission of data between a data computer and a communications terminal, the telecommunications network comprising:

a first transceiver unit to receive messages which are transmitted by the communications terminal according to a connectionless transmission protocol and to pass messages on to the communications terminal according to a connectionless transmission protocol, a second transceiver unit to pass the messages on to the data computer according to a connection-oriented transmission protocol and to receive messages which have been transmitted by the data computer according to a connection-oriented transmission protocol, and to pass the messages on to the communications terminal according to the connectionless transmission protocol, and which has a comparator unit, which reads out of an address memory which bearer the communications terminal uses to transmit data to the intermediate node, and a transmission device that transmits from a program memory to the communications terminal a program module which permits messages to be transmitted and received by the communications terminal via the connectionless transmission protocol.

15. The telecommunications network as claimed in claim 14, further comprising an intermediate node that is arranged in a message-related fashion between the communications terminal and the data computer which is connected to the telecommunications network.

* * * * *